(12) United States Patent
Maldonado-Cortés et al.

(10) Patent No.: US 6,971,320 B1
(45) Date of Patent: Dec. 6, 2005

(54) SINGLE VERSATILE AND FAST MOUNTING PAD FOR TRANSPORTING AND SUPPORTING DIFFERENT SIZES OF ELECTRICAL DISTRIBUTION TRANSFORMERS

(75) Inventors: Demófilo Maldonado-Cortés, San Pedro Centro Garza Garcia (MX); Carlos Gaytán-Cavazos, Monterrey (MX); Fernando Cerda-Rivera, San Nicolás de los Garza (MX); Gerardo Flores-Fuentes, Col. Nísperos Piedras Negras (MX)

(73) Assignee: Prolec GE, S.de R.L. de C.V., Apodaca (MX)

( * ) Notice: Subject to any disclaimer, the term of this patent is extended or adjusted under 35 U.S.C. 154(b) by 147 days.

(21) Appl. No.: 10/412,952

(22) Filed: Apr. 15, 2003

(51) Int. Cl.[7] ............................................. B65D 19/44
(52) U.S. Cl. .................................. 108/55.3; 108/51.11
(58) Field of Search ............................ 108/51.11, 901, 108/57.25, 57.28, 55.1, 55.3, 55.5; 206/386; 248/346.01, 678, 346.02; 336/65

(56) References Cited

U.S. PATENT DOCUMENTS

| | | |
|---|---|---|
| 3,962,660 A | 6/1976 | Duckett |
| 4,013,256 A * | 3/1977 | Hill ........................... 108/55.3 |
| 4,023,755 A | 5/1977 | Alesi, Jr. |
| 4,050,659 A | 9/1977 | McCannon et al. |
| 4,056,251 A | 11/1977 | Dixon et al. |
| 4,212,446 A | 7/1980 | Domanick et al. |
| 4,213,111 A | 7/1980 | Lux, Jr. |
| 4,267,399 A | 5/1981 | Lux, Jr. |
| 4,883,918 A | 11/1989 | Browning |
| 4,946,725 A | 8/1990 | Harlan |
| 5,686,696 A | 11/1997 | Baker, Jr. et al. |
| 5,739,464 A | 4/1998 | Adkins et al. |
| 5,833,207 A | 11/1998 | Hagenhoff et al. |
| 6,186,468 B1 | 2/2001 | Schlegel |

* cited by examiner

Primary Examiner—Jose V. Chen
(74) Attorney, Agent, or Firm—Egbert Law Offices

(57) ABSTRACT

A mounting pad for transporting and anchoring different sizes of electrical distribution transformers has a pad top surface with a plurality of sidewalls extending downwardly therefrom and a cellular subframework positioned below the pad top surface and within the plurality of sidewalls. The pad top surface has an access opening formed therein. A base flange extends outwardly from a bottom of the plurality of sidewalls. Forklifting slots having abutment surfaces are formed through a sidewall and into the subframework. The subframework has a plurality of ribs extending therein. Solid blocks are positioned in the subframework so as to allow the transformer to be secured thereto with helical screws.

2 Claims, 2 Drawing Sheets

SINGLE VERSATILE AND FAST MOUNTING PAD FOR TRANSPORTING AND SUPPORTING DIFFERENT SIZES OF ELECTRICAL DISTRIBUTION TRANSFORMERS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention deals with the field of quick and versatile mounting pads used for supporting distribution transformers normally positioned at ground level. Such mounting pads are preferably formed of a plastic material to prevent the electrical distribution transformer from contacting ground, water and other external deteriorating influences. Such mounting pads are most commonly used in residential areas currently utilizing underground electrical wiring protected against vandalism according to ANSI C57.12.25.

BACKGROUND OF THE INVENTION

Schlegel, in the U.S. Pat. No. 6,186,468, proposed an improved mounting pad apparatus made of a plastic material for supporting an electrical distribution transformer while maintaining it separated from the surrounding ground environment, which is usually turf. The mounting pad is formed of a pad top surface positioned upon a cellular sub-framework with sidewalls extending around a base flange that in turn extends outwardly for stability. Several rigid bars can be selectively positioned within various slots defined in the cellular sub-framework for strengthening and stiffening the mounting pad apparatus in various orientations. These rigid bars can be positioned in a parallel or perpendicular way with respect to one another for various applications where different types of strengthening parameters are required. The cellular sub-framework can also selectively define a plurality of fork lifting slots, which can extend through the sidewalls to facilitate lifting and movement of the mounting pad apparatus, even with a normally quite heavy electrical distribution transformer positioned thereon. Multiple fork lifting slots can be defined by the cellular sub-framework at various orientations with respect to one another to facilitate the use of the mounting pad apparatus in relatively inaccessible locations.

Hagenhoff et al, in the U.S. Pat. No. 5,833,207, proposed a support or pad for electrical distribution transformers. The pad is designed to permit multi-directional access to its underside; consequently, a special position is not needed once a transformer is mounted on it, which is accessible to the tines of a forklift truck from almost any upright orientation. In some embodiments the tine-receiving recesses do not abut an opening for the electrical cables attached to the transformer, the opening instead being bordered by sections of the pad. The multiple recesses of the pad thus fail to communicate with the openings, blocking any path along the underside from the periphery of the pad to the cable opening itself.

Adkins et al, in the U.S. Pat. No. 5,739,464, proposed an enclosure and latching structure for the cable compartment of a tank for a pad mounted distribution transformer. The enclosure is of non-conductive fire resistant material. A curved latch arm of non-conductive material is pivotally connected to the supporting structure mounted on the tank front panel of the transformer, above the midpoint thereof. The enclosure is shaped to conceal the cable compartment of the tank and is open at the back to engage the periphery of the tank panel. The enclosure has an opening in the front, adjacent to the top thereof, through which extends a locking device secured to the enclosure by mating with a locking structure located at the free end of the latch arm. This locking device engages a locking structure located at an elevated point on the enclosure, which is higher than the pivoted end of the latch aim. When the locking device and locking structure are tightened, a compression and moment loading are generated, which combine to create a force that holds the back opening of the enclosure tightly pressed against the periphery of the tank panel.

Baker Jr. et al in the U.S. Pat. No. 5,686,696, disclosed a transformer pad for receiving and supporting a utility transformer and for collecting and containing liquid leaking from the transformer. The transformer pad includes a box-shaped container having an open top and providing a reservoir for containment of liquid leaking from a transformer. A cover is provided on the open top. The cover has a containment area onto which a utility transformer can be placed and which includes one or more openings for receiving any liquid leaking from the transformer, directing the liquid to the interior of the container. A seal member is placed on the cover, adjacent to the containment area, to provide a seal around the periphery of a transformer.

Harlan in the U.S. Pat. No. 4,946,725, disclosed a method of constructing an equipment pad and the resultant pad. The method comprises the steps of laminating fiberglass material to the inner walls of the mold, providing a layer of polymer concrete in the base of the mold, covering the layer of concrete with a sheet of fiberglass material, covering the fiberglass material with an additional layer vault situated in the earth, the upper end thereof being received in the pad opening to provide easy access to and training room for underground electrical cables connected to the transformer.

Domanick et al, in the U.S. Pat. No. 4,212,446, disclosed a universal mounting pad for electrical distribution transformers. Adjustable means comprising a plurality of recesses with iron channels therein engage movable bolts to which a variety of different size transformers can be attached. The pad is normally made of plastic. A plurality of earth-collared augers hold the pad firmly in position.

Dixon et al in the U.S. Pat. No. 4,056,251, proposed a lightweight plastic transformer pad having upper and lower load bearing walls which are separated by a structurally integrated matrix of transverse supporting walls extending upwardly from the periphery of an array of apertures in the lower load bearing wall.

McCannon et al, in the U.S. Pat. No. 4,050,659, disclosed a transformer pad having a fiberglass reinforced plastic exterior surface and an expanded foam core.

Alesi, Jr. in the U.S. Pat. No. 4,023,755, disclosed an improved mounting provided for a residential transformer in which structural support for the load created by the weight of the transformer is provided by a wood and foam core enclosed within a plastic shell. Structural rigidity is provided by lateral and transverse cross braces connected to form a wooden framework. An aperture is formed through the structure and support blocks are provided at the interior boundary of the aperture and fasteners extend through the shell and through the support blocks of the framework to secure the shell to the framework. Reinforcing blocks are provided at the corners of the underside of the structure to prevent damage to the mounting whenever it is necessary to re-align or manipulate the mounting.

Duckett in the U.S. Pat. No. 3,962,660, disclosed a ground level transformer unit including a transformer and a pallet-pad, the pad being formed from a lightweight material and having on one side supporting surfaces of sufficient strength to form a pad mount base for the transformer and a surface for transporting the transformer unit by a fork lift truck and on the other side a number of latching points for accommodating a number of different size transformers, and a tamper proof ridge positioned to correspond to the dimensions of the various size transformers. The pad is permanently attached to the transformer for installation on site. The transformer units can be stacked for storage and shipped as a unit.

According to the description of the related art, there is no known single versatile and fast mounting pad for transporting and supporting different sizes of electrical distribution transformers.

BRIEF SUMMARY OF THE INVENTION

It is an object of the present invention to provide a lightweight single and easily handled mounting pad for electrical distribution transformers to be installed at ground level, which is formed of a strong structural plastic material.

It is also an object of this invention to provide a single mounting pad adaptable to use with a variety of sizes and ratings of electrical distribution transformers which have no moving parts or accessories to adjust the size of the transformer to the mounting pad. To achieve this objective, the pad top surface of the present invention will also include solid blocks of plastic material thereon adapted for anchoring any of several different sizes of electrical distribution transformers.

It is another object of the present invention to provide a single mounting pad which allows movement of the mounting pad simultaneously with an electrical distribution transformer secured thereto by a conventional forklift truck.

It is another object of the present invention to provide a single mounting pad which allows movement of the mounting pad simultaneously with an electrical distribution transformer secured thereto by a conventional forklift truck.

The present invention provides a single mounting pad including a pad top surface having an access opening therein. Such access opening, which is normally used for the passage of electrical wiring and other electrical conduits, is protected as they travel upwardly to the electrical distribution transformer by interconnected ribs against vandalism according to ANSI C57.12.25.

The pad of the present invention also comprises a cellular sub-framework of rigid plastic material, which extends below the pad top surface and between the sidewalls for strengthening and stiffening of the pad top surface. The pad top surface, the sidewalls and the cellular sub-framework are all preferably formed as a single integral member of a preferably high-density structural polyethylene or structural polyurethane foam material in order to increase the structural strength thereof. This cellular sub-framework member preferably defines a plurality of interconnected ribs forming the ground engaging support of the pad for further strengthening thereof and for supporting the pad top surface there above.

The cellular sub-framework may further include two fork lifting slots adaptable to receive conventional fork members from a forklift truck to facilitate movement and placement of the improved mounting pad apparatus as a single unit with the electrical distribution transformer fixed thereon. Preferably these two fork lifting slots will extend in a parallel way and will be spatially separated with respect to one another at the conventional spacing used for the fork members of a standard forklift truck in order to facilitate the lifting and movement of the pad while loaded. Buttes within the fork lifting slots may also be included to secure the cable connection area against vandalism and fork lifting arms penetration.

DETAILED DESCRIPTION OF THE INVENTION

Figure 1:
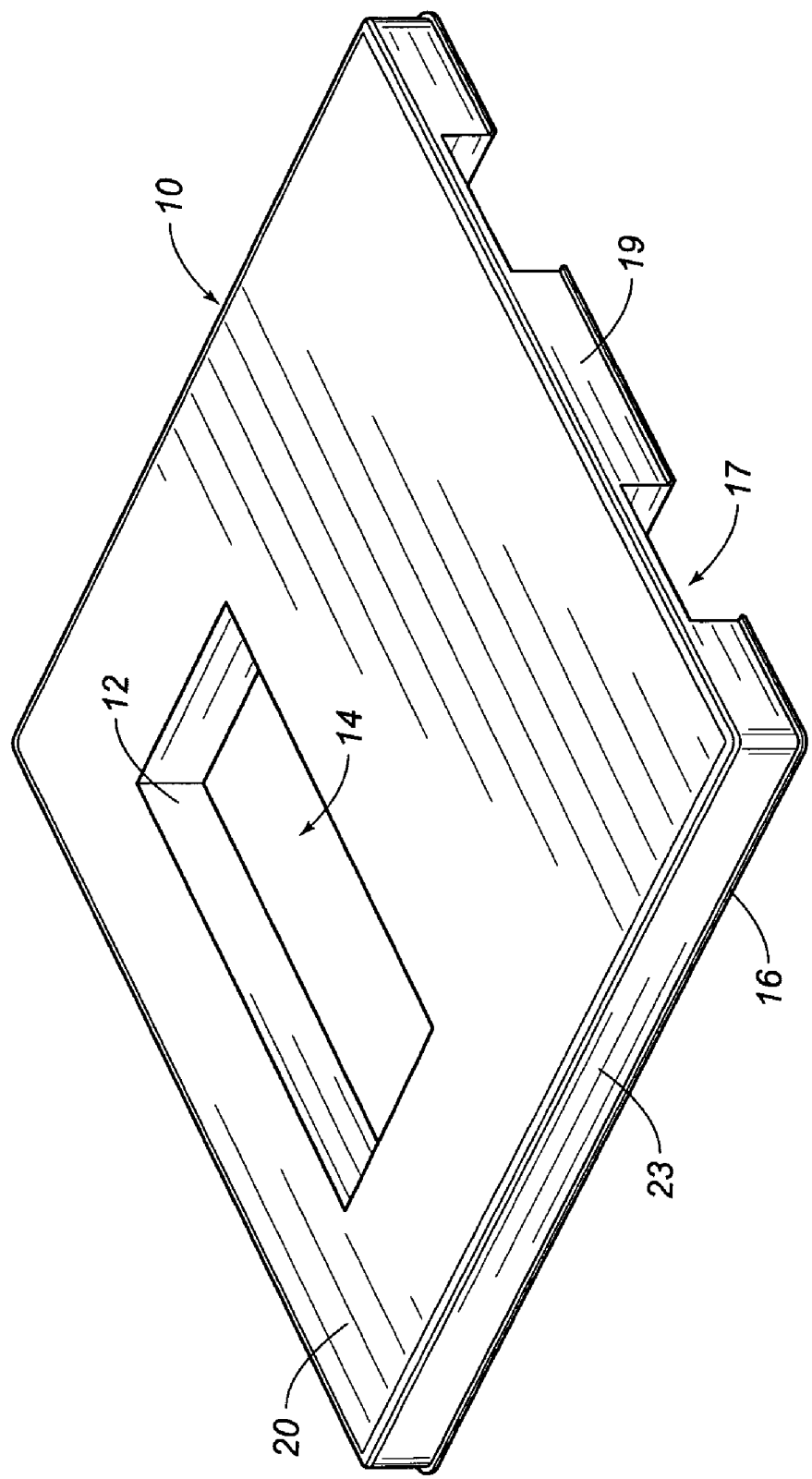
FIG. 1 is a top perspective view of an embodiment of the mounting pad according to the present invention.
Figure 2:
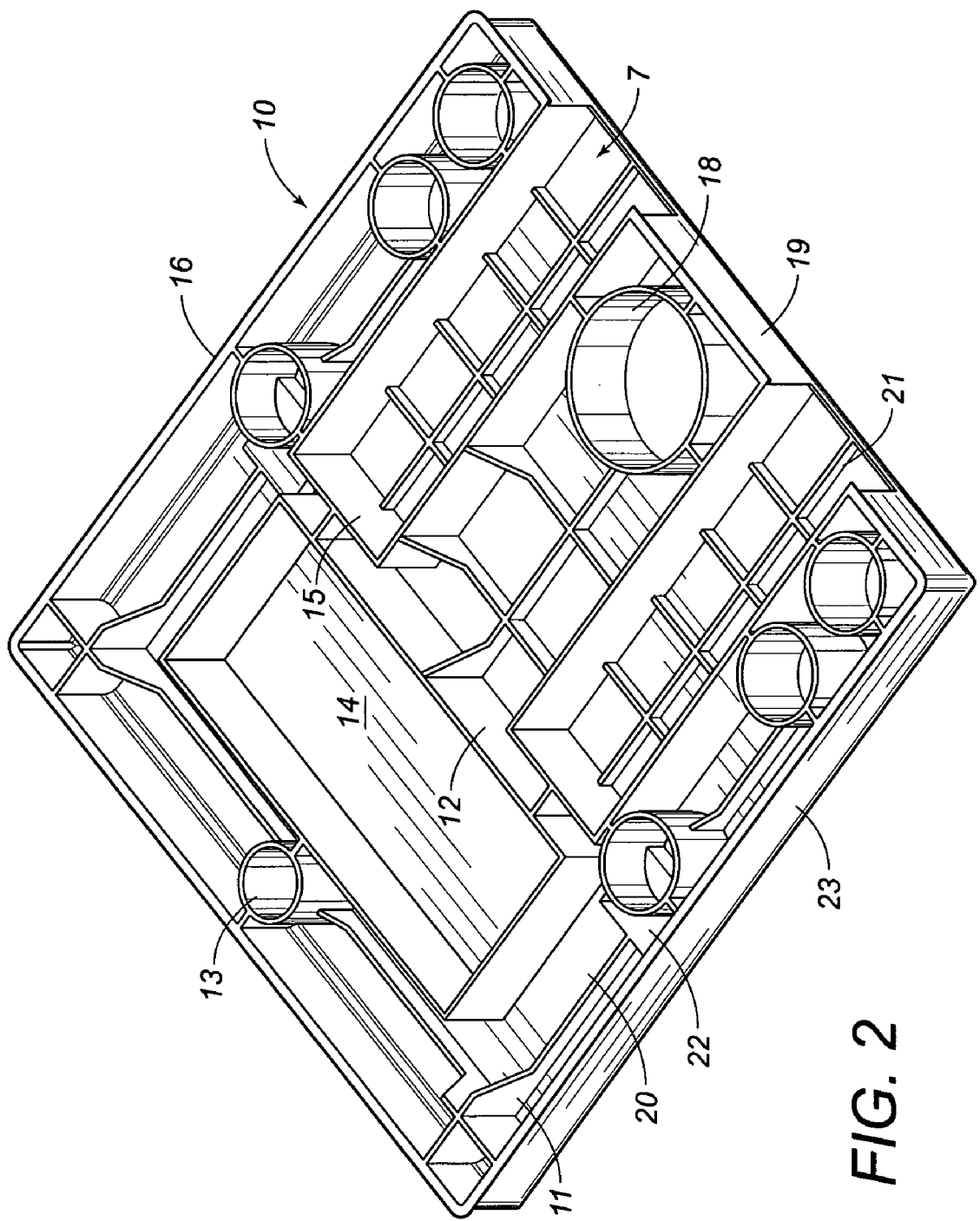
FIG. 2 is a bottom plan view of the embodiment shown in FIG. 1.

The single mounting pad for electrical distribution transformers according to the present invention is best understood by reference to the drawings shown in FIG. 1 and FIG. 2. The mounting pad 10 consists of a pad top surface 20. The electrical distribution transformer (not shown) is defined to be mounted on the pad top surface 20. This pad top surface 20 extends horizontally and defines an access opening 14 therein. The access opening 14 allows electrical lines to extend from the electrical distribution transformer (not shown) to electrically communicate with the underground wiring commonly utilized currently in residential and commercial locations. The access opening 14 is protected by interconnected ribs 12 against vandalism according to ANSI C57.12.25.

The pad of the present invention is of a lightweight non-slab structure as best illustrated in FIG. 2. A cellular sub-framework extends below the pad top surface 20 and between the sidewalls 19 and 23 for strengthening and stiffening of the pad top surface 20. This cellular sub-framework comprises a series of interconnected ribs 11, 12, 15, 21 that together form the ground engaging support means. The strength of the top surface 20 of the pad top surface is further enhanced by the use of a cellular sub-framework formed by a plurality of rib cylinders therein 13 and 18. The pad top surface 20, the sidewalls 19 and 23 and the cellular sub-framework are all preferably formed as a single integral member of high-density structural polyethylene or structural polyurethane foam material in order to increase the structural strength thereof.

The sidewalls 19 and 23 will extend downwardly to a base flange, which includes a widened support surface lip 16 which extends outwardly there from. This widened support surface lip 16 will increase the footprint of the mounting pad 10 and, as such, enhance the stability of positioning thereof upon the ground.

The cellular sub-framework may further include two fork lifting slots 17 adapted to receive conventional fork members from a forklift truck (not shown) to facilitate movement and placement of the improved mounting pad apparatus as a single unit with the electrical distribution transformer fixed thereon. Preferably these two fork lifting slots 17 will extend in a parallel way and will be spatially separated with respect to one another at the conventional spacing used for the fork members of a standard forklift truck (not shown) in order to facilitate the lifting and movement of the pad while loaded. Buttes 15 within the fork lifting slots may also be included to secure the cable connection area against vandalism and fork lifting arms penetration.

The invention herein is a universal mounting pad for anchoring any of several different sizes of electrical distribution transformers. Rather than having fixed holes or adjustable features, the pad of the present invention incorporates blocks of high-density polyetilene 22 to be used for the anchoring of any of a wide variety of different transformer sizes. The mounting pad 10 will be preferably attached to the electrical distribution transformer by helical screws (not shown) at any place of the surface of the block members 22. The particular position of the helical screws (not shown) will vary according to the particular transformer size to be mounted. In addition to the adaptability of a single pad size to many transformer sizes, the pad of the present invention also allows a rapid and easy replacement of different transformer sizes, simply by removing the mounting helical screws and reinserting them in a new position.

We claim:

1. A universal mounting pad for transporting and anchoring any of different sizes of electrical distribution transformers, the mounting pad comprising:

a pad top surface suitable for supporting the electrical distribution transformer thereon, said pad top surface having an access opening formed therein;

a plurality of sidewalls of polymeric material forming a single integral member with said pad top surface, said plurality of sidewalls extending downwardly from a periphery of said pad top surface;

a base flange of polymeric material secured to said plurality of sidewalls and extending outwardly therefrom and defining a widened support surface lip at a bottom end of said plurality of sidewalls;

a cellular subframework of a rigid polymeric material extending below said pad top surface and within said plurality of sidewalls, said subframework defining a plurality of ribs therein; and a pair of fork lifting slots formed in one of said plurality of sidewalls and into said subframework, said pair of fork lifting slots suitable for receiving fork members from a forklift truck, said pair of fork lifting slots extending in parallel spaced relation to each other, each of said pair of fork lifting slots having an abutment surface formed at an end thereof opposite the sidewall, said abutment surface suitable for sealing an interior of said subframework and for preventing penetration therethrough by the fork member, said subframework having a plurality of solid blocks of polymeric material arranged so as to allow for an anchoring of electrical distribution transformers through use of helical screws.

2. The universal mounting pad of claim 1, said pad top surface and said plurality of sidewalls and said subframework being integrally formed together of a high-density polymeric foam material, said high-density polymeric foam material being a polymer selected from the group consisting of polyethylene and polyurethane.

* * * * *